US011347850B2

(12) United States Patent
Boulton et al.

(10) Patent No.: US 11,347,850 B2
(45) Date of Patent: May 31, 2022

(54) ANALYZING BINARY SOFTWARE CODE

(71) Applicant: BlackBerry Limited, Waterloo (CA)

(72) Inventors: Adam John Boulton, Wirral (GB); William James McCourt, West Lothian (GB); Benjamin John Godwood, Chipping Norton (GB); Paul Compton Hirst, Tiverton (GB); Niall Fitzgibbon, London (GB)

(73) Assignee: BlackBerry Limited, Waterloo (CA)

( * ) Notice: Subject to any disclaimer, the term of this patent is extended or adjusted under 35 U.S.C. 154(b) by 108 days.

(21) Appl. No.: 16/148,690

(22) Filed: Oct. 1, 2018

(65) Prior Publication Data
US 2020/0104490 A1 Apr. 2, 2020

(51) Int. Cl.
*G06F 21/00* (2013.01)
*G06F 21/56* (2013.01)
*G06F 21/57* (2013.01)

(52) U.S. Cl.
CPC .......... *G06F 21/563* (2013.01); *G06F 21/577* (2013.01); *G06F 2221/033* (2013.01)

(58) Field of Classification Search
CPC . G06F 21/563; G06F 21/577; G06F 2221/033
See application file for complete search history.

(56) References Cited

U.S. PATENT DOCUMENTS

| 8,479,161 | B2 | 7/2013 | Weigert |
| 8,713,684 | B2 * | 4/2014 | Bettini ................... G06F 21/51 726/25 |
| 8,732,825 | B2 | 5/2014 | Park et al. |
| 8,819,819 | B1 | 8/2014 | Johnston et al. |
| 9,329,846 | B1 | 5/2016 | August et al. |
| 9,386,463 | B1 | 7/2016 | Contino et al. |
| 9,588,877 | B1 | 3/2017 | Adir et al. |
| 9,652,617 | B1 * | 5/2017 | Evans ..................... G06F 21/56 |
| 9,798,884 | B1 | 10/2017 | Bishop, III et al. |
| 9,817,974 | B1 | 11/2017 | Huang et al. |
| 10,162,966 | B1 | 12/2018 | Huang et al. |

(Continued)

FOREIGN PATENT DOCUMENTS

| CN | 108090360 A * | 5/2018 | ............ G06F 21/56 |
| KR | 20150083627 | 7/2015 | |
| WO | 2006039351 | 4/2006 | |

OTHER PUBLICATIONS

Extended European Search Report issued in European Application No. 19200590.8 dated Oct. 30, 2019, 6 pages.

(Continued)

*Primary Examiner* — Don G Zhao
(74) *Attorney, Agent, or Firm* — Fish & Richardson P.C.

(57) ABSTRACT

Systems, methods, and software can be used to analyze binary software codes. In some aspects, a computer-implemented method comprises: scanning, by at least one hardware processor, a binary software code to identify one or more text strings; associating, by the at least one hardware processor, the binary software code with a software platform based on the identified one or more text strings; disassembling, by the at least one hardware processor, the binary software code based on the software platform associated with the binary software code; and detecting, by the at least one hardware processor, a security risk in the disassembled binary software code.

11 Claims, 2 Drawing Sheets

(56) References Cited

U.S. PATENT DOCUMENTS

| | | | |
|---|---|---|---|
| 10,534,914 B2 | 1/2020 | Nakajima et al. | |
| 10,657,262 B1* | 5/2020 | Cui | G06F 21/577 |
| 2003/0195861 A1* | 10/2003 | McClure | H04L 63/1433 |
| 2003/0217039 A1* | 11/2003 | Kurtz | G02B 6/12023 |
| 2004/0010703 A1 | 1/2004 | Kouznetsov et al. | |
| 2004/0015728 A1* | 1/2004 | Cole | H04L 63/145 |
| | | | 726/23 |
| 2004/0078384 A1* | 4/2004 | Keir | G02B 6/105 |
| 2006/0036394 A1* | 2/2006 | Chen | G01R 31/318511 |
| | | | 702/123 |
| 2006/0075468 A1 | 4/2006 | Boney et al. | |
| 2007/0011319 A1* | 1/2007 | McClure | H04L 41/12 |
| | | | 709/224 |
| 2008/0010538 A1* | 1/2008 | Satish | G06F 21/563 |
| | | | 714/38.13 |
| 2008/0066180 A1* | 3/2008 | Repasi | H04L 51/04 |
| | | | 726/24 |
| 2008/0109871 A1* | 5/2008 | Jacobs | H04L 63/20 |
| | | | 726/1 |
| 2008/0263659 A1 | 10/2008 | Alme | |
| 2009/0144698 A1* | 6/2009 | Fanning | G06F 11/3676 |
| | | | 717/120 |
| 2010/0125913 A1 | 5/2010 | Davenport et al. | |
| 2010/0241469 A1* | 9/2010 | Weigert | G06F 11/3604 |
| | | | 717/124 |
| 2010/0242028 A1* | 9/2010 | Weigert | G06F 21/105 |
| | | | 717/131 |
| 2010/0281248 A1 | 11/2010 | Lockhart et al. | |
| 2011/0173693 A1 | 7/2011 | Wysopal et al. | |
| 2012/0072968 A1 | 3/2012 | Wysopal et al. | |
| 2012/0144486 A1 | 6/2012 | Navaraj et al. | |
| 2013/0227683 A1* | 8/2013 | Bettini | G06F 21/53 |
| | | | 726/22 |
| 2013/0298230 A1* | 11/2013 | Kumar | H04L 63/1425 |
| | | | 726/22 |
| 2014/0165204 A1* | 6/2014 | Williams | H04L 63/02 |
| | | | 726/25 |
| 2015/0067148 A1 | 3/2015 | Kim | |
| 2015/0172303 A1* | 6/2015 | Humble | H04L 63/1408 |
| | | | 726/23 |
| 2015/0227746 A1* | 8/2015 | Chen | G06F 21/54 |
| | | | 726/25 |
| 2015/0248556 A1* | 9/2015 | Sickendick | G06F 21/563 |
| | | | 726/23 |
| 2015/0254017 A1 | 9/2015 | Soja et al. | |
| 2015/0261955 A1 | 9/2015 | Huang et al. | |
| 2015/0304337 A1* | 10/2015 | Nguyen-Tuong | G06F 40/169 |
| | | | 726/1 |
| 2015/0377961 A1 | 12/2015 | Lin et al. | |
| 2016/0094564 A1 | 3/2016 | Mohandas et al. | |
| 2016/0099963 A1 | 4/2016 | Mahaffey et al. | |
| 2016/0147517 A1 | 5/2016 | Vicovan et al. | |
| 2017/0111375 A1* | 4/2017 | Provos | H04L 63/145 |
| 2017/0180370 A1 | 6/2017 | Satoh et al. | |
| 2017/0213039 A1* | 7/2017 | Werner | G06F 21/53 |
| 2017/0262633 A1* | 9/2017 | Miserendino | G06F 21/564 |
| 2017/0277890 A1* | 9/2017 | Hayrynen | G06F 11/3688 |
| 2017/0286692 A1 | 10/2017 | Nakajima et al. | |
| 2018/0025157 A1* | 1/2018 | Titonis | H04W 12/1208 |
| | | | 726/24 |
| 2018/0068121 A1* | 3/2018 | Gray | G06F 11/3636 |
| 2018/0121659 A1 | 5/2018 | Sawhney et al. | |
| 2018/0183822 A1* | 6/2018 | Tan | H04L 51/04 |
| 2018/0218157 A1* | 8/2018 | Price | H04L 63/1441 |
| 2018/0225460 A1 | 8/2018 | Nakajima et al. | |
| 2018/0260301 A1* | 9/2018 | Podjarny | G06F 16/2379 |
| 2018/0307840 A1* | 10/2018 | David | H04L 63/1441 |
| 2018/0349598 A1* | 12/2018 | Harel | G06F 21/562 |
| 2019/0050515 A1 | 2/2019 | Su et al. | |
| 2019/0095183 A1* | 3/2019 | Shukla | G06F 8/53 |
| 2019/0132334 A1* | 5/2019 | Johns | G06F 21/562 |
| 2019/0188392 A1* | 6/2019 | El-Moussa | G06K 9/6267 |
| 2019/0205526 A1* | 7/2019 | Boulton | G06F 21/566 |
| 2019/0205527 A1* | 7/2019 | Boulton | G06F 21/54 |
| 2019/0236269 A1* | 8/2019 | Hay | G06F 11/3688 |
| 2019/0243964 A1 | 8/2019 | Shukla et al. | |
| 2019/0354689 A1* | 11/2019 | Li | G06N 3/08 |
| 2020/0097662 A1 | 3/2020 | Hufsmith et al. | |
| 2020/0104492 A1 | 4/2020 | Boulton | |
| 2020/0104493 A1 | 4/2020 | Boulton | |

OTHER PUBLICATIONS

Extended European Search Report issued in European Application No. 19200283.0 dated Nov. 12, 2019, 6 pages.
Notice of Allowance issued in U.S. Appl. No. 16/148,757 dated Jan. 25, 2021, 6 pages.
Notice of Allowance issued in U.S. Appl. No. 16/148,730 dated Jan. 26, 2021, 6 pages.
Notice of Allowance issued in U.S. Appl. No. 16/148,757 dated Feb. 10, 2021, 10 pages.
PCT International Search Report and Written Opinion in International Application No. PCT/EP2019/076,254, dated Jan. 3, 2020, 14 pages.
Notice of Allowance issued in U.S. Appl. No. 16/148,757 dated Apr. 2, 2021, 13 pages.
Communication Pursuant to Article 94(3) EPC issued in European Application No. 19200590.8 dated Dec. 16, 2021, 4 pages.

* cited by examiner

ANALYZING BINARY SOFTWARE CODE

TECHNICAL FIELD

The present disclosure relates to analyzing binary software code to determine security risks in the binary software code.

BACKGROUND

In some cases, software services can be provided by executable binary software code. The binary software code is computer software in a binary format. The computer software can be an application software, a system software (e.g., an operating system or a device driver), or a component thereof. The binary software code can also be referred to as executable code.

DESCRIPTION OF DRAWINGS

Like reference numbers and designations in the various drawings indicate like elements.

DETAILED DESCRIPTION

In some cases, a software developer can submit binary software code to a software service platform that is operated by a software provider. The binary software code is executed on the software service platform to provide software services to users. The software service platform can be implemented in a cloud computing environment.

In some implementations, the software provider would inspect the software for security risks. Security risks can include malicious software code that would harm users' devices, expose user's information, or a combination thereof. Security risks can also include code that is vulnerable to malicious attacks.

If the binary software code is submitted without the source code, it may be difficult to inspect the binary software code to identify the security risks. The binary software code can include a stream of bytes that are generated by compiling the source code of the software. Thus, the binary software code is not in a readable format and cannot be easily parsed or analyzed.

In some cases, the binary software code can be submitted with metadata information that identifies the software platform of the binary software code. The software platform can comprise an operating system that the binary software code can be executed on, or the software language that is used to program the source code of the binary software code. The metadata information can be used to disassemble the binary software code, select the corresponding decompiler to decompile the binary software code, or a combination thereof. After disassembling, decompiling, or both, it would be much easier to inspect the binary software code for security risks. However, in some implementations, the binary software code may be submitted without metadata information that identifies the software platform of the binary software code.

Figure 1:
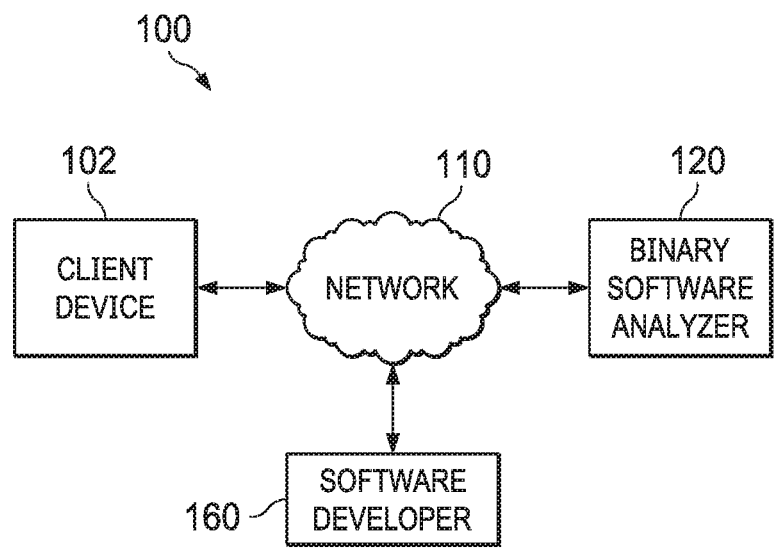
FIG. 1 is a schematic diagram showing an example communication system that analyzes binary software code, according to an implementation.
Figure 3:
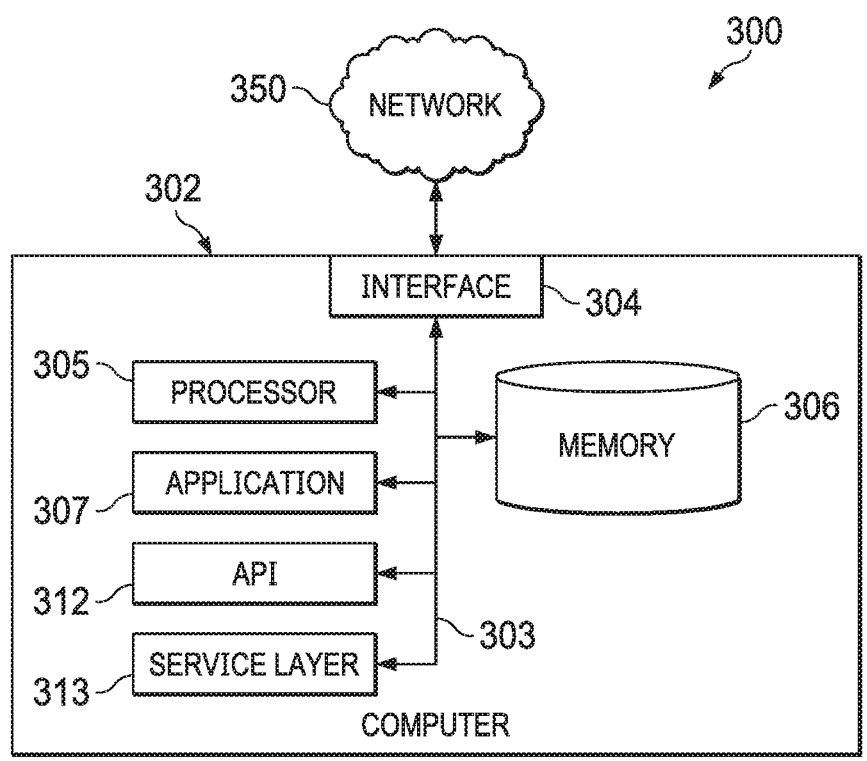
FIG. 3 is a high-level architecture block diagram of a computing system, according to an implementation.
Figure 2:
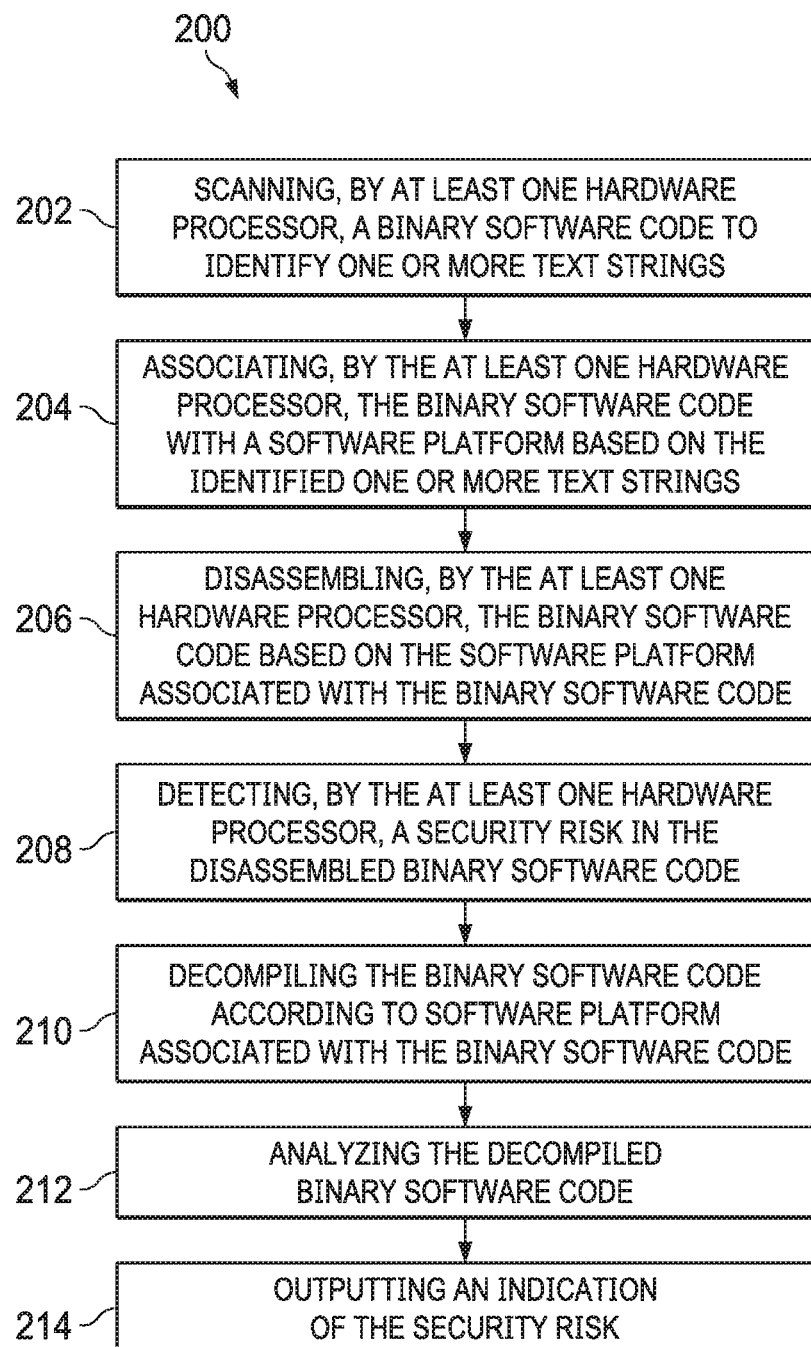
FIG. 2 is a flow diagram showing an example method that analyzes binary software code to determine security risks, according to an implementation.

In some implementations, the binary software code can be scanned by a binary software code analyzer to identify one or more text strings. The binary software code analyzer can determine a software platform that is associated with the binary software code based on the these text strings. The binary software analyzer can further disassemble and decompile the binary software code according to the associated software platform, and identify security risks in the binary software code accordingly. In some cases, the binary software analyzer can be implemented on the software service platform of the software provider. Therefore, the software service platform can provide integrated operations that include software submission, inspection, and service access for providing the software services, in particular for the cases where software codes are submitted in binary formats without metadata information that identifies the software platform of the binary software code. FIGS. 1-3 and associated descriptions provide additional details of these implementations.

FIG. 1 is a schematic diagram showing an example communication system 100 that analyzes binary software code, according to an implementation. At a high level, the example communication system 100 includes a client device 102, a software developer 160, and a binary software analyzer 120 that are communicatively coupled with a network 110.

The software developer 160 represents an application, a set of applications, software, software modules, hardware, or any combination thereof that can be configured to submit binary software code. The binary software code can be executable software that provides software services to the client device 102. Example of the software services can include software as a service (SaaS) applications such as SALESFORCE, OFFICE 365, or other software application services. In some cases, the binary software code can be submitted to the binary software analyzer 120. The binary software codes can also be submitted to a software provider that provides the software services, and the software provider can send the binary software codes to the binary software analyzer 120 for security analysis before including the binary software code in the software service for the client device 102.

The binary software analyzer 120 represents an application, a set of applications, software, software modules, hardware, or any combination thereof that can be configured to analyze the binary software codes for security risks. In some implementations, the binary software analyzer 120 can identify text strings in the byte streams of the binary software codes, associate one or more software platforms with the binary software codes based on the text strings, disassemble and decompile the binary software codes according to the associated software platform, and detect security risks based on the associated software platform. In some implementations, the binary software analyzer 120 can be implemented on a cloud computing platform operated by the software provider. FIGS. 2-3 and associated descriptions provide additional details of these implementations.

The client device 102 represents an electronic device that accesses a software service provided by the software provider. In some cases, a browser or a client application can be executed on the client device 102 to communicate service requests and service responses with the software service platform of the software provide to obtain software services.

Turning to a general description, the client device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or combination thereof, that can be configured to transmit data messages between the entities in the system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flow diagram showing an example method 200 that analyzes binary software codes to determine security risks, according to an implementation. The method 200 can be implemented by a binary software analyzer, e.g., the binary software analyzer 120 shown in FIG. 1. The method 200 shown can also be implemented using additional, fewer, or different entities. Furthermore, the method 200 can be implemented using additional, fewer, or different operations, which can be performed in the order shown or in a different order.

The example method 200 begins at 202, where a binary software code is scanned to identify one or more text strings. In some implementations, the binary software code can be submitted by a software developer over a network. The binary software code can represent an application software, a system software (e.g., an operating system or a device driver), or a component thereof. The binary software code can also be referred to as executable code. The binary software code can be received without the corresponding source code of the software.

In some implementations, text strings are encoded in software codes using one or more encoding protocols. Examples of the encoding protocols include the American Standard Code for Information Interchange (ASCII) encoding protocol or the Unicode protocol. A text strings includes one or more consecutive text characters. Examples of the text characters include alphabetic letter, numbers, punctuation marks, and symbols. In some cases, a text character can also be referred to as an alphanumeric character. Each text character is encoded into a binary number according to an encoding protocol. The size of the binary number can be 8 bits (1 byte), 16 bits (2 bytes), 32 bits (4 bytes), or 64 bits (8 bytes). For example, in ASCII protocol, the lower case letter "a" is encoded as 0x61, or "01100001" in binary number. In an encoding protocol, text characters are defined within a range of binary numbers. Therefore, by scanning the byte stream of the binary software code to check the values of each byte, two bytes, four bytes, or eight bytes (depending on the size of binary number of the encoding protocol), different text characters can be identified. For text characters that appear consecutively in the binary software codes, these text characters form a text string. In some cases, the scanning can be performed from the beginning of the binary software code (forward scanning), from the end of the binary software code (backward scanning), or from both the beginning and the end of the binary software code (parallel scanning).

At 204, the binary software code is associated with a software platform based on the identified one or more text strings. A software platform can be an operating system (OS) in which the binary software code is executed. For example, the software platform can be LINUX, UNIX, WINDOWS, MAC OS, ANDROID, IOS, QNS, or any other suitable conventional operating system. The software platform can also be a software language or format in which the source code of the binary software code is programmed. For example, the software platform can be JAVA, JAVASCRIPT, Extensible Markup Language (XML), C, C++ or other languages. The software platform can also be other format information that can be used to classify the binary software code for disassembling and analyzing. For example, the software platform can be software development platform such as Automotive Open System Architecture (AutoSAR).

In some cases, the identified text strings can indicate the software platform of the binary software code. For example, the text strings can include a keyword that corresponds to a particular software platform. In some implementations, a list of keywords and their corresponding software platform can be configured. The list can be stored at the binary software analyzer. The binary software analyzer can match the identified text strings with the keywords on the list to determine the software platform of the binary software code. In some cases, multiple keywords can be matched. In these cases, the binary software code can be associated with more than one software platform so that different disassembling processes can be attempted based on different software platforms.

In some cases, the text strings can include an email address or a Uniform Resource Locator (URL). These text strings can be identified based on one or more specific characters. For example, an email address can be identified by the "@" character in the text string. A URL can be identified by the "HTTP," "HTTPS," or "FTP" characters in the text string. If these text strings are identified, the binary software code can also be associated with network category type, indicating that the binary software code may perform network connection related functions.

At 206, the binary software code is disassembled according to the associated software platform. The disassembling process parses the binary software code into different components, instruction sets, or a combination thereof. Because different software platforms organize the software differently and have different patterns for their instruction sets, the software platforms identified at the step 204 can be used to disassemble the binary software code according to the specific characteristics of the identified software platform. For example, the binary software code can be matched to an example structure of the software platform to extract data and information included in the binary software code.

At 208, the disassembled binary software codes are analyzed to detect security risks. In some cases, the binary software analyzer can store or have access to a set of known patterns for potentially malicious codes for different software platforms. These patterns can exist in the format of binary codes. The binary software analyzer can thus analyze each component of the disassembled binary software code and detect the presence of the patterns corresponding to the associated software platform. If one or more patterns are detected, the binary software analyzer can determine that the binary software codes has a security risk.

Alternatively or in addition, the binary software analyzer can store or have access to a set of known patterns for potentially malicious codes that relate to network connection functionalities. If the binary software code is associated with the network category type, as determined in the step 204, the binary software analyzer can also determine that the binary software code has a security risk if the binary software analyzer detects the presence of the patterns corresponding to the network connection functionalities.

At 210, the binary software code is decompiled according to the associated software platform. Different software platforms have different compilers and decompilers. Therefore, the binary software code can be decompiled into source codes using the decompiler corresponding to the associated software platform. In some cases, more than one software platform may be identified at 204. In these cases, the binary software code can be decompiled more than one time, each time using the decomplier corresponding to different associated software platforms so that the correct software platform can be determined.

At 212, the decomplied binary software code (the source code) is analyzed to determine if there is a security risk in the code.

At 214, the results of the binary software code analysis are outputted. The output can include one or more indicators indicating the presence of the security risks, the type of security risks, or a combination thereof that are detected at the step 208 or 212. The output can also include the text strings identified at step 202. The output can also include the indications of the software platform, network category type, or a combination thereof that are identified at step 204. In some cases, the output can be displayed on a user interface of the binary software analyzer, transmitted to another device, e.g., the software developer that submits the binary software code, a client device that requests or download the binary software code, or an administrator of the service provider for further analysis.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the binary software analyzer 120 shown in FIG. 1. The computer 302 can also be used to implement other computing devices, e.g., the client device 102 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
    scanning, by at least one hardware processor, a binary software code to identify one or more text strings, wherein the binary software code is executable, and the scanning the binary software code to identify the one or more text strings comprises:
        reading a byte stream in the executable binary software code;
        converting bytes in the byte stream of the executable binary software code into text characters based on at least one of an American Standard Code for Information Interchange (ASCII) encoding protocol or a Unicode protocol; and
        identifying the one or more text strings in the text characters;
    associating, by the at least one hardware processor, the binary software code with a software language based on the identified one or more text strings;
    disassembling, by the at least one hardware processor, the binary software code based on the software language associated with the binary software code;
    determining that the one or more text strings include an email address;
    in response to determining that the one or more text strings in the binary software code include the email address, determining that the binary software code performs a network connection related function and associating the binary software code with a network category type; and
    in response to associating the binary software code with network category type, detecting, by the at least one hardware processor, a security risk in the disassembled binary software code based on the network category type.

2. The method of claim 1, further comprising: decompiling the binary software code according to the software language associated with the binary software code.

3. The method of claim 1, further comprising: outputting an indication of the security risk.

4. The method of claim 3, further comprising: outputting the one or more text strings with the indication of the security risk.

5. A device, comprising:
    at least one hardware processor; and
    one or more computer-readable storage media coupled to the at least one hardware processor and storing programming instructions for execution by the at least one hardware processor, wherein the programming instructions, when executed, cause the at least one hardware processor to perform operations comprising:
        scanning, by the at least one hardware processor, a binary software code to identify one or more text strings, wherein the binary software code is executable, and the scanning the binary software code to identify the one or more text strings comprises:
            reading a byte stream in the executable binary software code;
            converting bytes in the byte stream of the executable binary software code into text characters based on at least one of an American Standard Code for Information Interchange (ASCII) encoding protocol or a Unicode protocol; and
            identifying the one or more text strings in the text characters;
        associating, by the at least one hardware processor, the binary software code with a software language based on the identified one or more text strings;
        disassembling, by the at least one hardware processor, the binary software code based on the software language associated with the binary software code;
        determining that the one or more text strings include an email address;
        in response to determining that the one or more text strings in the binary software code include the email address, determining that the binary software code performs a network connection related function and associating the binary software code with a network category type; and
        in response to associating the binary software code with network category type, detecting, by the at least one hardware processor, a security risk in the disassembled binary software code based on the network category type.

6. The device of claim 5, wherein the operations further comprise: decompiling the binary software code according to the software language associated with the binary software code.

7. The device of claim 5, wherein the operations further comprise: outputting an indication of the security risk.

8. The device of claim 7, wherein the operations further comprise: outputting the one or more text strings with the indication of the security risk.

9. One or more non-transitory computer-readable media containing instructions which, when executed, cause a computing device to perform operations comprising:
    scanning, by at least one hardware processor, a binary software code to identify one or more text strings, wherein the binary software code is executable, and the scanning the binary software code to identify the one or more text strings comprises:
        reading a byte stream in the executable binary software code;
        converting bytes in the byte stream of the executable binary software code into text characters based on at least one of an American Standard Code for Information Interchange (ASCII) encoding protocol or a Unicode protocol; and
        identifying the one or more text strings in the text characters;

associating, by the at least one hardware processor, the binary software code with a software language based on the identified one or more text strings;

disassembling, by the at least one hardware processor, the binary software code based on the software language associated with the binary software code;

determining that the one or more text strings include an email address;

in response to determining that the one or more text strings in the binary software code include the email address, determining that the binary software code performs a network connection related function and associating the binary software code with a network category type; and in response to associating the binary software code with network category type, detecting, by the at least one hardware processor, a security risk in the disassembled binary software code based on the network category type.

10. The one or more computer-readable media of claim 9, wherein the operations further comprise: decompiling the binary software code according to the software language associated with the binary software code.

11. The one or more computer-readable media of claim 9, wherein the operations further comprise: outputting an indication of the security risk.

* * * * *